United States Patent

[11] 3,612,835

[72] Inventors Boley A. Andrews
Shawnee Mission, Kans.;
James F. Ptacek, Kansas City, Mo.
[21] Appl. No. 886,530
[22] Filed Dec. 19, 1969
[45] Patented Oct. 12, 1971
[73] Assignee The Vendo Company
Kansas City, Mo.

[54] COMBINED OPTICAL AND MAGNETIC TRANSDUCER
11 Claims, 4 Drawing Figs.

[52] U.S. Cl. 235/61.11 D
[51] Int. Cl. G06k 7/01
[50] Field of Search 235/61.11 R, 61.11 D, 61.11 E; 346/74 MC; 250/219 R, 219 Q, 219 D, 219 DD, 219 WE, 219 DQ

[56] References Cited

UNITED STATES PATENTS

| | | | |
|---|---|---|---|
| 2,704,634 | 3/1955 | Rauch | 235/61.11 E |
| 3,092,402 | 6/1963 | Reed | 235/61.11 E |

*Primary Examiner*—Daryl W. Cook
*Attorney*—Schmidt, Johnson, Hovey and Williams

ABSTRACT: A combined optical and magnetic transducer for sensing both optical and magnetic properties of an article, for example, a piece of paper currency or other document having both visible and magnetic markings to be tested or read, an information-bearing medium such as a data-recording tape to be read, or the like. The transducer comprises a magnetic-sensing head having a transparent gap separating the poles of the magnetic core of the head, a photoelectric element being disposed in the head in alignment with the gap. Outside the head, one side of the article contacts or is in close proximity to the poles at the gap, and the article is illuminated by a light source, so that both magnetic properties and optical properties of the article may be detected simultaneously during relative movement of the article and the transducer.

INVENTORS.
Boley A. Andrews
James F. Ptacek
BY
Schmidt, Johnson, Hovey, Williams & Chase.
ATTORNEYS.

COMBINED OPTICAL AND MAGNETIC TRANSDUCER

This invention relates to apparatus for use in validating or reading articles having both significant visible markings or information and significant magnetic markings or information thereon (for example, paper currency or documents bearing magnetic printing to be tested or read, data-recording media such as tapes, cards or discs to be read, etc.) and, in particular, to a combined optical and magnetic transducer.

In the paper currency validating art, for example, the systems heretofore proposed have employed various means of sensing either the magnetic or the optical properties, or both, of selected portions of a bill. In the case of dual sensing, however, physical limitations have required that different portions of the bill be selected for magnetic and optical detection, or that opposite sides of the bill be subjected to the magnetic and optical tests. Utilizing physically separated magnetic and optical sensors, sequential sensing has been required when it was desired to sense the same area both optically and magnetically, which necessarily involved relative movement of the sensors and the bill between the magnetic and optical tests.

Accordingly, it is an important object of the present invention to provide a means of sensing both the magnetic and the optical properties of a single zone of an article, e.g., a piece of paper currency, a document, a data-recording medium or the like, and wherein such dual sensing may be accomplished simultaneously.

As a corollary to the foregoing object, it is an important aim of this invention to provide dual sensing means which can effect both the magnetic and optical sensing from a single side of the article, yet with assurance that the same zone is sensed in both instances.

A further and important object of the invention is to provide a dual sensing means in which the optical sensing may be effected by detecting the transmittance of the zone of an article which is also being tested for its magnetic properties.

It should be appreciated that, through the provision of such a combined optical and magnetic transducer, the invention achieves extreme versatility that facilitates the design of high-speed validating or reading systems of improved reliability. The optical and magnetic properties of the same zone of an article may be determined simultaneously, if desired, and from a single side of the document, thereby providing a tool for the development of systems designed to advantageously utilize the unique characteristics of the present invention.

Furthermore, the invention provides an improved means of reading both magnetically and optically represented information on recording tape, such as in data processing or other applications, where it is desired to simultaneously read two sets of related or independent information from a single track. Accordingly, it is another important object of this invention to provide a combined optical and magnetic transducer for use in connection with a data-recording medium containing information stored in both optical and magnetic form.

Still another important object of this invention is to provide a combined optical and magnetic transducer which is compact and relatively uncomplex and inexpensive.

Those skilled in the art will readily appreciate that the invention is adapted for use in a wide variety of applications and that the articles whose characteristics are to be sensed for testing, reading or other purposes may be of diverse forms. For the sake of convenience and relative brevity, therefore, the principles of the invention will be explained primarily with reference to one specific illustrative application; namely, a preferred embodiment involving utilization of the invention in connection with the testing of paper currency. The scope of the invention and its contemplated range of applications should be understood, however, as extending also to the data-processing and information retrieval fields generally and as intended to be limited only by the spirit and terms of the claims which follow.

Figure 1:
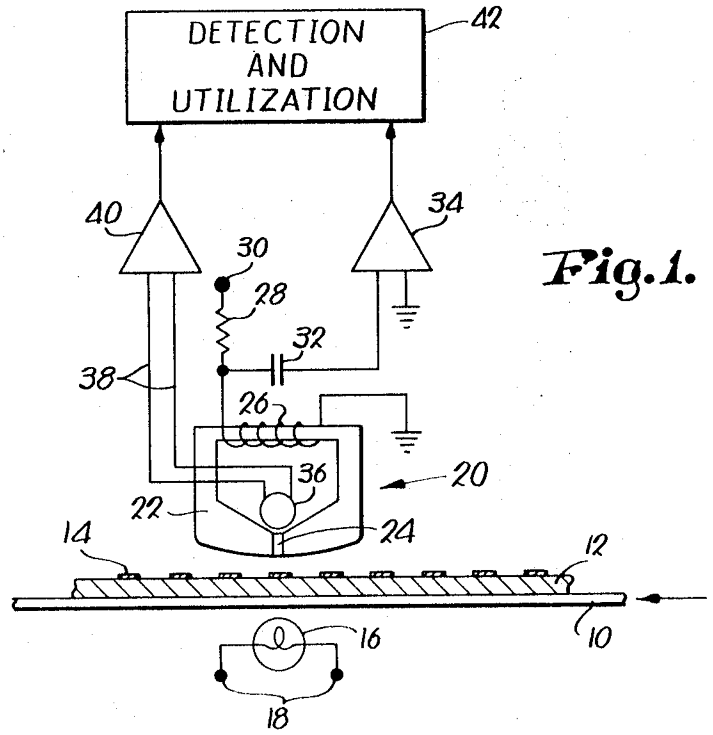
FIG. 1 is a diagrammatic and electrical schematic illustration of the transducer, an article to be sensed such as a currency bill under test, and associated circuitry.

Referring initially to FIG. 1, the reference numeral 10 broadly identifies means for supporting an article 12 to be sensed and for providing relative motion between the article 12 and the transducer broadly designated 20 hereinafter described, if desired. It will be understood, of course, that such relative motion may be produced by movement of the means 10, the transducer 20 or both. Means 10 may be a split or transparent conveyor, a transparent tray or other suitable support for receiving the article or document 12, which in the illustrated embodiment may comprise a piece of paper currency. One side of the document 12 (the top surface thereof in FIG. 1) has spaced lines 14 of magnetic ink printing thereon. It will be appreciated that the illustration is entirely diagrammatic and is not intended to be to scale. The lines 14 may, for example, be the vertical lines of the portrait background on a one-dollar bill of U.S. currency.

An electric lamp 16 is located beneath the support means 10 and is connected to a suitable electrical power source as represented by the terminals 18. A combined optical and magnetic transducer 20 is located above the means 10 and is described in detail hereinbelow.

An opaque core 22 of magnetic material forms a magnetic circuit within the transducer 20, the core 22 being continuous and closed in a loop except for the presence of a gap 24 across which magnetic flux must pass to bridge the ends or poles of the core 22. In order to maintain the proper gap spacing, a transparent, magnetically insert spacer is preferably disposed in the gap 24 and may, for example, be composed of quartz or glass or a similar material. A coil 26 is wound around one leg of the core 22, one end thereof being connected to a direct current power source by a register 28. One side of the DC source is represented by the terminal 30 to which the resistor 28 is connected. The opposite end of the coil 26 is connected to circuit ground as illustrated by the symbol, this being the return side of the DC supply. A capacitor 32 connects the common junction of the coil 26 and the resistor 28 to the input of an amplifier 34. A photoelectric element 36 is disposed adjacent the gap 24 within the transducer 20 and is connected by leads 38 to an amplifier 40. The outputs of the amplifier 34 and 40 are delivered to detection and utilization apparatus 42, which may be of any conventional nature, for example, gating circuitry for producing an output signal or action in response to the occurrence of predetermined outputs from amplifiers 34 and 40, as further discussed hereinafter.

Figure 2:
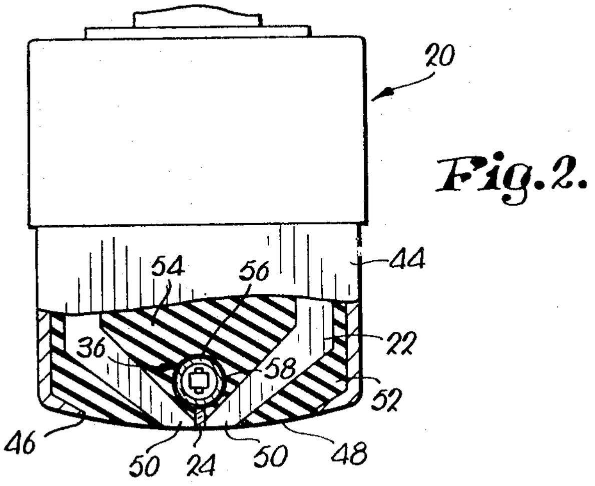
FIG. 2 is a side view of the transducer, the case being broken away to reveal the interior construction.
Figure 3:
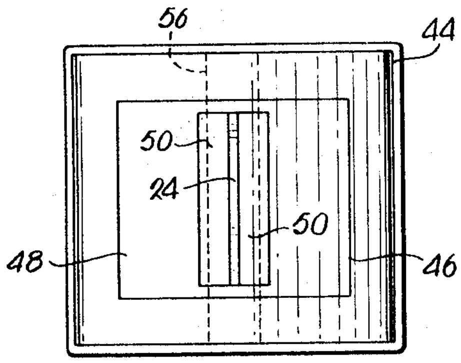
FIG. 3 is a plan view of the face of the transducer.
Figure 4:
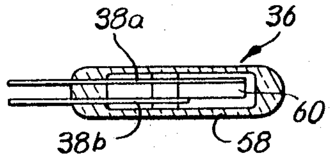
FIG. 4 is a view of the photoelectric element removed from the transducer, the envelope of the element being shown in cross section.

The construction of the transducer 20 is better understood by reference to FIGS. 2–4. A nonmagnetic case 44 houses the electrical components of the transducer 20, the latter basically comprising a magnetic tape head modified to include the photoelectric element 36 as a composite part thereof. A rectangular opening 46 in the case 44 exposes the curved face 48 of the head and the poles 50 of the core 22. A jacket of insulation 52 between the core 22 and the case 44, and a central block 54 of rigid, insulating material within the open center of the core 22 serve to support and hold the magnetic structure.

A transverse, cylindrical opening 56 in the block 54 receives the photoelectric element 36, the latter having a cylindrical, transparent envelope 58. The opening 56 extends the length of the gap 24 in parallelism therewith as is clear in FIG. 5 and extends completely through the block 54 directly above the gap 24 as viewed in FIG. 2. The opening 56 is sized to receive the envelope 58 and hold the element 36 in place within the block 54 in alignment with the gap 24 and is located as close to the gap 24 as physical considerations permit.

The photoelectric element 36 illustrated herein is a diffused-junction silicon photovoltaic light sensor of subminiature size, such as a type LS 222 made by Texas Instruments Incorporated of Dallas, Tex. The element 36 has a photosensitive area 60 to which internal leads 38a and 38b are connected. The element 36 is positioned in the opening 56 with the sensitive area 60 longitudinally centered with respect to the gap 24. Conventional magnetic tape record/playback heads are readily modified to incorporate the element 36 thereinto by drilling the opening 56 in the block 54, increasing the gap space to approximately 0.003 to 0.004 inch and substituting an appropriately sized gap spacer of optically clear material.

In describing the operation of the combined transducer of the present invention in the exemplary application portrayed in FIG. 1, it is assumed that the support means 10 is moveable beneath the head with the document 12 loaded thereon in order to bring the printed lines 14 into contact or close proximity to the face 48 of the head at the gap 24. The arrow in FIG. 1 illustrates movement of the loaded support means 10 beneath the head, it being appreciated that the lamp 16 and the photoelectric element 36 are in direct alignment with each other and the intervening gap 24. Therefore, the gap 24 serves as an aperture for transmission of light rays from the zone of the document 12 beneath the gap 24 to the element 36. Such light rays enter the gap 24 after passage through the zone under test, and thus the intensity of these rays will be a function of the transmittance of the document at the incremental portions thereof subjected to the optical and magnetic tests.

Since the magnetic ink constituting the lines 14 on a piece of currency is normally not magnetized, a fixed bias is applied to the magnetic circuit of the transducer 20. This is accomplished by the direct current flowing in the coil 26, the latter and core 22 thus comprising an electromagnet generating lines of force bridging the two poles 50 at the gap 24. Accordingly, the gap 24 defines a proximal region in which the presence of the magnetic ink causes a variable signal component to be induced in the coil 26 due to the change in permeability at the gap 24. This variable component is coupled by the capacitor 32 to the amplifier 34 and constitutes the output signal of the magnetic sensing means.

From the foregoing, it may be appreciated that the optical and magnetic sensing is accomplished independently and simultaneously, yet the same zone of the document 12 is tested for both optical and magnetic properties. Since magnetic sensing is accomplished at the gap 24 and the latter also serves as an aperture for transmission of light energy to the element 36, it is assured that identically the same incremental portion of the document 12 is subjected to both the optical and the magnetic tests at any particular instant.

The detection and utilization apparatus 42 may employ conventional detector circuitry of either the frequency-sensitive or intensity-sensitive type (including sensitivity to the presence or absence of an input signal), depending upon the particular application. In the optical or magnetic input channel, either an input signal produced by scanning or an input signal indicative of the characteristics of a discrete spot on the document may be utilized by the detector. The amplitude and frequency characteristics of the input signal in each channel depend upon the relative movement of the document 12 and the transducer 20, as well as the actual magnetic and optical properties of the document 12. Furthermore, gating circuitry within the detector may be arranged to handle the incoming signals in any of a number of ways as may be dictated by the particular system design.

The foregoing description with reference to FIG. 1 presents an example of utilization of the transducer 20 in currency testing and validating equipment. Other applications would include the reading of any other suitable media or articles bearing both optically and magnetically represented information, in which case transducer 20 is arranged with the exposed faces of the poles 50 in contact with one side of the medium in the usual manner. The opposite side of the medium is illuminated, and thus the transducer 20 senses the optical and magnetic recordings simultaneously as the medium is advanced. The fixed magnetic bias discussed above would normally not be employed, if the existing magnetically sensible information on the medium is in premagnetized form.

Having thus described the invention, what is claimed as new and desired to be secured by Letters Patent is:

1. Apparatus for sensing optical and magnetic properties of an article, said apparatus comprising:
magnetic-sensing means provided with magnetic circuit structure having a substantially transparent gap therein adapted for disposition in proximal relationship to the article to sense magnetic properties thereof; and
optical-sensing means disposed to sense optical properties of the article through said gap.

2. The apparatus as claimed in claim 1,
said optical-sensing means being disposed in the path of light rays entering said gap after incidence with the article.

3. The apparatus as claimed in claim 1,
said magnetic-sensing means producing an output signal in response to the sensed magnetic properties,
said gap defining a proximal region in which the presence of a magnetic substance causes the magnetic-sensing means to respond; and
means for positioning a zone of the article in said region.

4. The apparatus as claimed in claim 3,
said optical-sensing means producing an output signal in response to the sensed optical properties, and being disposed in the path of light rays entering said gap from said region after incidence with the article at said zone thereof.

5. The apparatus as claimed in claim 1,
there being a light source for illuminating the article for transmission of light rays therefrom to said optical-sensing means through said gap,
said structure being opaque and said gap being interposed in the path of the rays from said source to said optical sensing means.

6. The apparatus as claimed in claim 5,
there being means for positioning a zone of the article between said source and said gap, whereby the optical-sensing means senses the transmittance of the article at said zone.

7. The apparatus as claimed in claim 1,
said magnetic and optical sensing means being simultaneously operative.

8. The apparatus as claimed in claim 1,
said structure comprising a magnetic core presenting said gap, the latter having inner and outer extremities, said magnetic-sensing means having a coil on said core for delivering an output signal indicative of the sensed magnetic properties,
said optical-sensing means including a photosensitive element adjacent said inner extremity and aligned with said gap.

9. The apparatus as claimed in claim 8,
there being means for positioning a zone of the article adjacent said outer extremity of the gap.

10. The apparatus as claimed in claim 1,
each of said sensing means producing an output signal indicative of the properties sensed thereby; and
detection means coupled with both of said sensing means and responsive to the output signals therefrom for reading the characteristics of the article.

11. Apparatus for sensing optical and magnetic properties of an article, said apparatus comprising:
light transmittance sensing means including a pair of spaced, coacting elements;
magnetic-sensing means provided with magnetic circuit structure having a gap therein disposed between said elements and defining a light-transmitting aperture; and
means for positioning a zone of said article between said elements and proximal to said gap for sensing of magnetic properties of the article at said zone by said magnetic-sensing means,
said elements comprising a light source for illuminating said zone and a photosensitive device responsive to light rays transmitted through the article at said zone.